United States Patent [19]
Lee

[11] Patent Number: 5,623,138
[45] Date of Patent: Apr. 22, 1997

[54] METHOD AND APPARATUS FOR FOCUSING CONTROL OF AN OBJECT LENS FOR FOCUSING LIGHT ON AN OPTICAL DISK

[75] Inventor: Kyoung H. Lee, Anyang, Rep. of Korea

[73] Assignee: Samsung Electronics Co., Ltd., Kyungki-Do, Rep. of Korea

[21] Appl. No.: 428,519

[22] Filed: Apr. 25, 1995

[30] Foreign Application Priority Data

Jul. 28, 1994 [KR] Rep. of Korea .................... 94-18474

[51] Int. Cl.$^6$ ................... G02B 27/40; G02B 7/04; G11B 7/00
[52] U.S. Cl. ................... 250/201.5; 369/44.34; 369/54
[58] Field of Search ................... 250/201.4, 201.5; 369/44.34, 44.35, 54

[56] References Cited

U.S. PATENT DOCUMENTS 4,286,318 8/1981 Immink et al. .................... 369/44.35
5,197,058 3/1993 Bell, Jr. et al. .................... 369/44.34

*Primary Examiner*—Stephone Allen
*Attorney, Agent, or Firm*—Sughrue, Mion, Zinn, Macpeak & Seas

[57] ABSTRACT

A focusing control apparatus has a controller and a memory so as to store the control signal of a previous step in the memory. The control signal detected by a photo-detector is changed according to the changes of temperature and light intensity input from a light source. The apparatus performs focusing control by summing in an adder signal output by the controller, which signal is the stored signal on which a computation has been performed, and the new signal input. The apparatus detects and controls an offset signal of the focusing error signal by providing a low-pass filter between the adder and the controller. A feedback circuit including an anti-aliasing circuit is further provided between the output of the adder and the controller, whereby a new focusing control signal is transmitted by correcting the signal stored in the memory after a computation has been performed thereon by the controller. Therefore, the focusing control signal transmitted to the driver of the object lens is stably maintained and the design of a control compensator can be simplified by the use of the feedback circuit.

8 Claims, 2 Drawing Sheets

METHOD AND APPARATUS FOR FOCUSING CONTROL OF AN OBJECT LENS FOR FOCUSING LIGHT ON AN OPTICAL DISK

BACKGROUND OF THE INVENTION

The present invention relates to a method and apparatus for optical pickup focusing control, and more particularly, to a method and apparatus for optical pickup focusing control by a controller and a memory provided in a driving loop which can adapt to changes in circumstances and characteristics of the focusing system.

As shown in FIG. 1, in a conventional optical pickup, a laser diode 10, a collimating lens 30, a beam splitter 40 for dividing light projected from laser diode 10, an object lens 50 for focusing the beam reflected by beam splitter 40, and a disk 70 as an information recording medium are sequentially disposed. Also, the optical pickup has actuator 60 for driving the object lens. The light reflected from the surface of disk 70 is transmitted through beam splitter 40 or reflected from the beam splitter. The transmitted light is detected by photo-detector 80 containing an optical dividing board which is divided into at least two portions. If the optical dividing board has four dividing portions, the light transmitted to each divided portion is converted into a current signal and two signals generated by divided portions facing each other on the diagonal lines of the board are summed to be input into the input ports of differential operator 90 for comparing the difference of the input signals. Differential operator 90 detects the difference of the two input signals and converts the detected current signal into a voltage signal.

FIG. 2 is a waveform diagram representing an error according to the distance of the converted focusing voltage signal to be detected at point "a" of FIG. 1. X-axis and Y-axis coordinates represent a distance error and a voltage, respectively. The focusing error signal is amplified through amplifier 100 shown in FIG. 1 and drives object lens 50 in a direction minimizing the distance error using the amplified focusing error signal. Object lens 50 is driven by actuator 60. Control compensator 110 is provided adjacent to amplifier 100 for obtaining the control input necessary for controlling actuator 60. Driver 130 is provided between control compensator 110 and actuator 60 to drive actuator 60 according to the signal from control compensator 110.

As described above, the conventional focusing control apparatus needs a stable closed loop which is reconnected to actuator 60 by passing through actuator 60, photo-detector 80, differential operator 90, amplifier 100, control compensator 110 and driver 130 and should be designed so that the distance error occurring due to a fluctuation of disk 70 is within an allowable error range. As a result, it is difficult to design control compensator 110 since the allowable error range (±0.5 μm) is less than the movement of disk 70 (±0.5 mm), requiring control compensator 100 to include many compensators. Also, there are problems in that the sensitivity of photo-detector 80 and actuator 60 used for obtaining the distance error signal may vary significantly so that the gain and offset of amplifier 100 has to be compensated by adjusting a variable resistance during assembly and in that the optical pickup system can be unstable if the sensitivity is varied due to changes in operating conditions such as temperature, the intensity of radiation of a light source and the like.

SUMMARY OF THE INVENTION

It is an object of the present invention to provide a focusing control method in which the design of a compensator is simplified by adding a memory function which can actively cope with changes in temperature and changes in the intensity of radiation of a light source thereto, and an optical pickup system is stably operated according to a change of sensitivity.

It is another object of the present invention to provide an apparatus which stably performs a focusing control.

To achieve an object of the present invention, there is provided a focusing control method of an object lens for focusing light on an optical disk comprising the steps of:

detecting a focusing error signal which represents the degree of the focusing error of the object lens from a reflected light of the optical disk;

storing the detected focusing error signal in a memory;

summing the stored signal and a currently detected focusing error signal; and driving an actuator for the object lens using the summed signal.

To achieve another object of the present invention, there is provided a focusing control apparatus of an object lens for focusing light on an optical disk according to the present invention comprising:

photo-detecting means for detecting the focusing error signal representing the degree of focusing error of the object lens from the reflected light of the optical disk;

control means for storing and computing the detected focusing error signal;

summing means for summing the signal stored in the control means and a currently detected focusing error signal; and driving means for driving an actuator for the object lens using the signal summed by the summing means.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
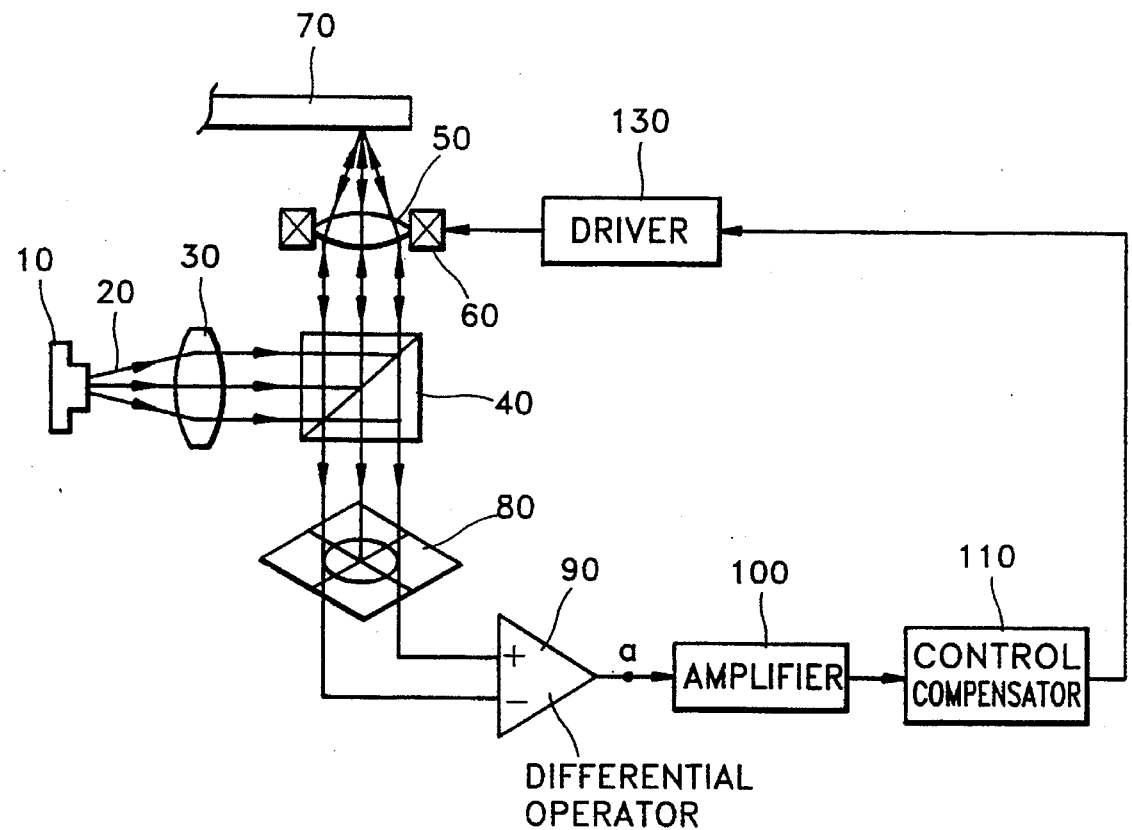
FIG. 1 is a block diagram showing the conventional optical pickup focusing control apparatus.
Figure 2:
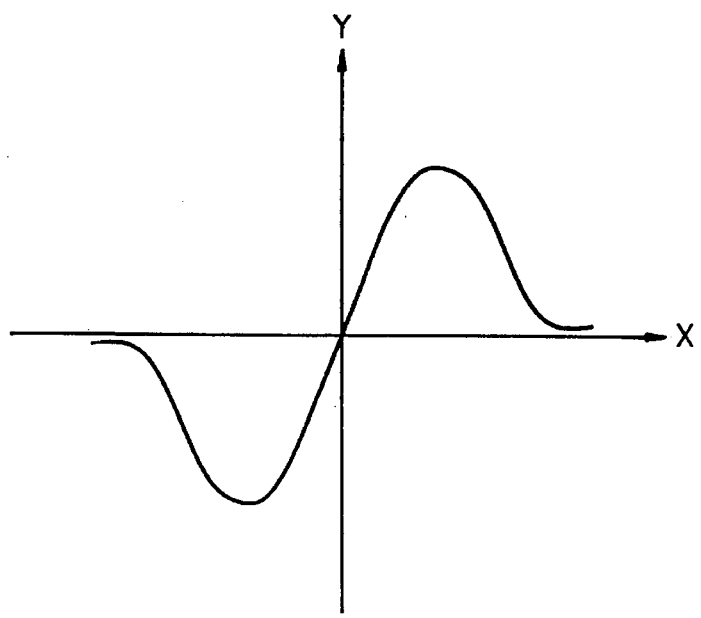
FIG. 2 is a waveform diagram demonstrating a distance error to a voltage signal detected at point "a" of FIG. 1.
Figure 3:
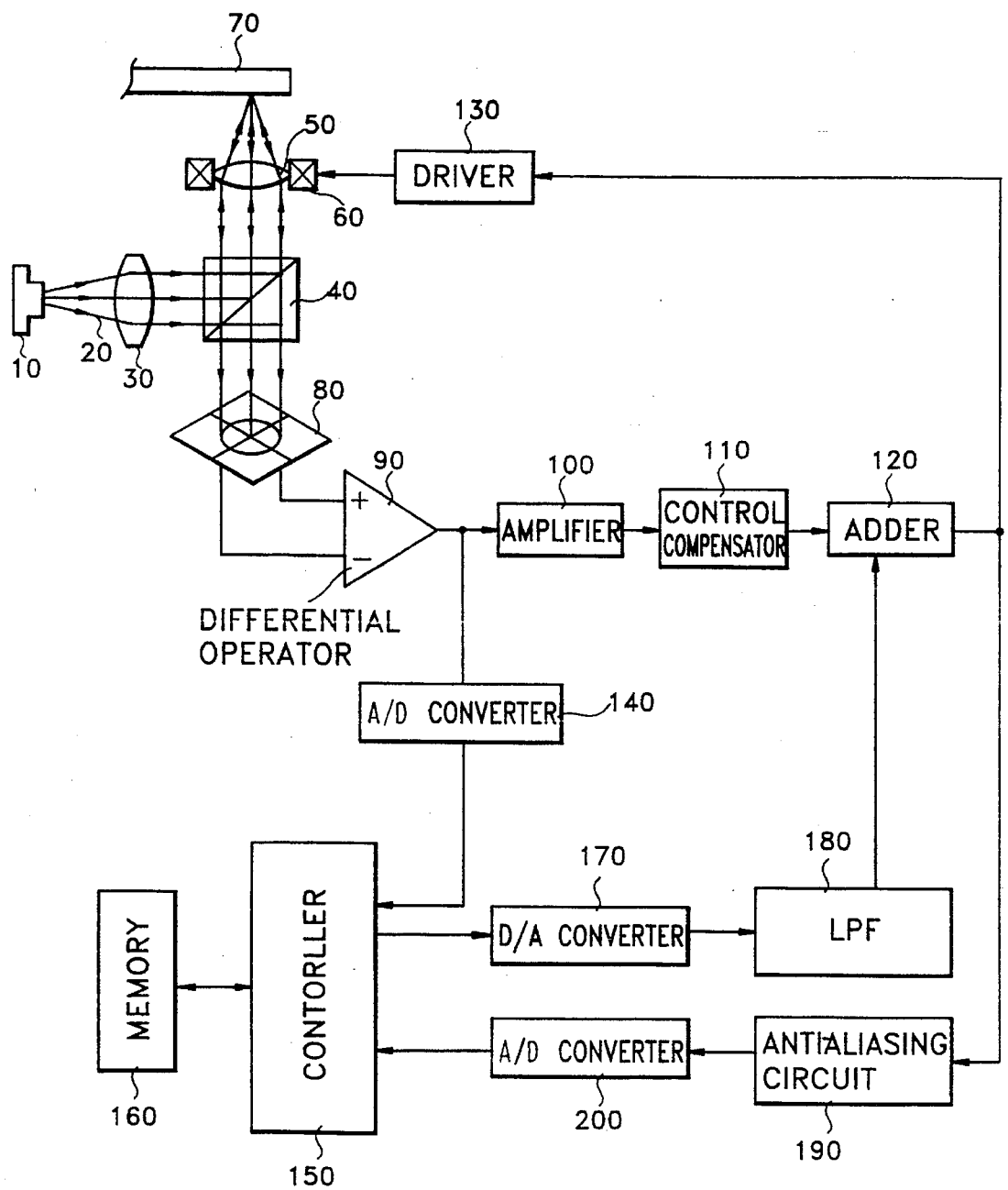
FIG. 3 is a block diagram showing a focusing control apparatus according to the present invention.

Referring to FIG. 3, the function and construction of the optical pickup control apparatus according to the present invention are as follows.

A laser diode 10, a collimating lens 30 for changing the light projected from laser diode 10 into parallel light, a beam splitter 40 for dividing light 20, an object lens 50 for focusing light 20 divided by beam splitter 40, an actuator 60 for driving object lens 50, and a disk 70 as an information recording and reproducing medium are disposed in sequence to thereby form the optical system of an optical pickup. The light reflected from the surface of disk 70 is transmitted through beam splitter 40 or reflected from beam splitter 40. The transmitted light is detected by photo-detector 80.

Here, when a current signal is detected by photo-detector 80, if the optical dividing board contained in the photo-detector has four divided portions, signals detected from the divided portions along two diagonal lines of the board are summed to be input to the input ports of a differential operator 90. Differential operator 90 detects the difference between two input signals and converts the detected current signal into a voltage signal. The focusing error signal output from a photo-detecting portion having photo-detector 80 and differential operator 90 is amplified by an amplifier 100. A control compensator 110 is installed at the output of amplifier 100 so as to obtain a control input for moving object lens 50 in the direction which minimizes the distance error, using the amplified focusing error signal. Thus, the detecting apparatus includes the photo-detecting portion, amplifier 100 and control compensator 110. A driver 130 is provided between the detecting means and actuator 60 to amplify the electrical signal obtained from control compensator 110.

In the basic circuit as described above, an A/D converter 140 for converting an analog focusing error signal input from differential operator 90 into a digital signal, a controller 150 for computing and controlling according to the converted signal, a memory 160 independently connected to controller 150 so as to store the signal computed at controller 150 and transmit the stored signal to controller 150, a D/A converter 170 connected with controller 150 and for converting the digital signal computed and corrected at controller 150 into an analog signal, and an adder 120 installed at the output of the detecting means to sum the signal transmitted from D/A converter 170 via LPF 180 (described later) and the output signal of control compensator 110, are disposed in another path between the output of differential operator 90 and the input of driver 130.

The operation for controlling the actuator by the above constitution will be described below.

The light containing a signal indicating the distance error of a spot formed on the recording surface of disk 70 is converted into a voltage signal containing the focusing error signal via the photo-detecting portion. The converted voltage signal passes through voltage amplifier 100 and control compensator 110 to generate a control signal. The control signal is applied to the driving apparatus including the actuator and the driver so as to move object lens 50 to a proper position. Concurrently with the generation of the control signal, the signal input from the photo-detecting portion to controller 150 via A/D converter 140 is stored in memory 160 according to the input sequence. The signal applied to the summing means including adder 120 via controller 150 is a zero signal during the first rotation period. At this time, the focusing error signal computed at controller 150 and control information are stored in memory 160. When disk 70 returns to the original position after the first rotation, the signal detected from the photo-detecting means is computed and stored by control means including controller 150 and memory 160. The signal is computed with the error signal and control information stored in memory 160. The result is applied to the summing means via D/A converter 170. Since the above operation is repeatedly performed according to the rotation period of disk 70, a desired position of object lens 50 can be correctly adjusted according to the control information output from controller 150 in spite of a change in the gain of the photo-detecting means due to the focusing error signal and changes in the temperature and the intensity of radiation of a light source.

A low-pass filter 180 for removing the noise having high frequency components transmitted from the control means is installed between the control means and the summing means.

A feedback loop may be provided between the output of adder 120 and controller 150 so that the sum signal of the signal computed in controller 150 and the signal from control compensator 110 is fed back to controller 150, is computed by controller 150 and stored in memory 160 in sequence, thereby obtaining a more correct focusing control signal. Describing the feedback circuit in detail, anti-aliasing filter 190 is installed in an alternate path at the output of adder 120. A/D converter 200 is coupled to the output of anti-aliasing filter 190, so that the analog signal which is input is converted into a digital signal, thereafter inputting the signal into controller 150. Here, anti-aliasing filter 190 reduces noise by removing the high frequency components when the analog signal is changed into a digital signal, thereby increasing signal quality.

The description of signal transmission characteristics of the above focusing control apparatus using a numerical formula follows.

If a rotation period of a disk is T and a sampling number is N during one period 1T, focusing error and control input kth-sampled from the start of the period are expressed as e(k) and u(k), respectively, and when disk 70 rotates R times from the start of the focusing control, the focusing error and control input are expressed as $e_R(k)$ and $u_R(k)$, respectively, a new control input $u_R^c(k)$ between low-pass filter 180 and adder 120 is generated from information stored by the immediately preceding rotation, thereby being represented as follows.

$$u_R^c(k)=p\times[\alpha u_{R-1}(k)+\beta e_{R-1}(k)]$$

where $\alpha$ and $\beta$ are constants generated in the controller and p is a constant related to the low-pass filter.

The control input $u_R^d(k)$ measured between control compensator 110 and adder 120 is directly calculated by control compensator 110. Therefore, the control input is expressed as follows.

$$u_R^d(k)=D\times E\times e_R(k)$$

where D and E represent input signals at voltage amplifier 100 and control compensator 110, respectively. Therefore, the control input at the output side of adder 120 is expressed as follows.

$$u_r(k)=u_R^c(k)+u_R^d(k)$$
$$=p\times[\alpha u_{R-1}(k)+\beta e_{R-1}(k)]+D\times E\times e_R(k)$$

Here, if $\alpha$ and $\beta$ are properly adjusted according to the characteristics of the optical system, the cut-off frequency of low-pass filter 180 is properly obtained, whereby the desired characteristics can be obtained.

Also, since control compensator 110 has a phase lead shape having one pole and one zero in a different manner from the conventional control compensator, the stability of the closed loop including actuator 60, photo-detector 80, differential operator 90, amplifier 100, control compensator 110, adder 120 and driver 130 in order can be accomplished.

According to the present invention, the disadvantages of a conventional focusing apparatus which requires three or more poles and zeros to ensure that the stability of the closed loop can be confirmed and to ensure that the distance error caused by the fluctuation of the disk is within the desired error range can be overcome.

Also, the focusing control apparatus according to the present invention can stably operate even though the sensitivity of the focusing error detecting circuit is decreased by half due to changes of ambient temperature and the intensity of radiation of a light source, and can compute the control input for compensation by detecting the offset signal of the focusing error signal whereby the apparatus can operate stably during the change in offset.

What is claimed is:

1. A method of focusing control of an object lens for focusing a light on an optical disk comprising the
   - detecting a focusing error signal which represents a degree of focusing error of the object lens from a reflected light of the optical disk;
   - storing the detected focusing error signal in a memory;
   - summing the stored signal and a currently detected focusing error signal;
   - driving an actuator for the object lens using the summed signal; and
   - re-storing the summed signal in the memory.

2. A method of focusing control of an object lens for focusing a light on an optical disk comprising the steps of:
   - detecting a focusing error signal which represents a degree of focusing error of the object lens from a reflected light of the optical disk;
   - storing the detected focusing error signal in a memory;
   - summing the stored signal and a currently detected focusing error signal;
   - driving an actuator for the object lens using the summed signal;
   - re-storing the summed signal in the memory; and
   wherein said method further comprises a high frequency signal filtering step for blocking a high frequency component signal between said storing step and said summing step.

3. A method of focusing control of an object lens for focusing a light on an optical disk comprising the steps of:
   - detecting a focusing error signal which represents a degree of focusing error of the object lens from a reflected light of the optical disk;
   - storing the detected focusing error signal in a memory;
   - summing the stored signal and a currently detected focusing error signal;
   - driving an actuator for the object lens using the summed signal;
   - restoring the summed signal in memory; and
   - removing high frequency components prior to A/D conversion of the summed signal between said summing step and said restoring step thereby performing anti-aliasing.

4. A method of focusing control of an object lens for focusing a light on an optical disk comprising the steps of:
   - detecting a focusing error signal which represents a degree of focusing error of the object lens from a reflected light of the optical disk;
   - storing the detected focusing error signal in a memory;
   - retrieving the stored focusing error signal
   - blocking a high frequency component signal of the retrieved focusing error signal to produce a noise-reduced signal;
   - summing the noise-reduced signal and a currently detected focusing error signal;
   - driving an actuator for the object lens using the summed signal;
   - restoring the summed signal in the memory; and
   - removing high frequency components prior to A/D conversion of the summed signal between said summing step and said re-storing step.

5. An apparatus for a focusing control of an object lens for focusing a light on an optical disk comprising:
   - photo-detecting means for detecting a focusing error signal representing a degree of focusing error of the object lens from reflected light of the optical disk;
   - control means for storing and computing the detected focusing error signal;
   - summing means for summing the signal stored in said control means and a currently detected focusing error signal;
   - driving means for driving an actuator for the object lens using the signal summed by the summing means; and
   - a feedback loop for re-storing the focusing error signal corrected by the control means, said feedback loop being provided between an output of said summing means and said control means.

6. An apparatus as claimed in claim 5, wherein said feedback loop comprises anti-aliasing means for removing a high frequency bandwidth prior to A/D conversion.

7. An apparatus for a focusing control of an object lens for focusing a light on an optical disk comprising:
   - photo-detecting means for detecting a focusing error signal representing a degree of focusing error of the object lens from reflected light of the optical disk;
   - control means for storing and computing the detected focusing error signal;
   - summing means for summing the signal stored in said control means and a currently detected focusing error signal;
   - driving means for driving an actuator for the object lens using the signal summed by the summing means;
   - a low-pass filter, for removing high frequency noise components, disposed between said control means and said summing means; and
   - a feedback loop for re-storing the focusing error signal corrected by the control means, said feedback loop being provided between an output of said summing means and said control means.

8. An apparatus as claimed in claim 7, wherein said feedback loop comprises anti-aliasing means for removing a high frequency bandwidth prior to A/D conversion.

* * * * *